United States Patent [19]

Hay et al.

[11] Patent Number: 5,176,721
[45] Date of Patent: Jan. 5, 1993

[54] ADSORBER AND PROCESS FOR THE SEPARATION BY ADSORPTION

[75] Inventors: Léon Hay, Paris; Xavier Vigor, Viroflay, both of France

[73] Assignee: L'Air Liquide, Societe Anonyme Pour L'Etude et L'Exploitation des Procedes Georges Claude, Paris, France

[21] Appl. No.: 772,496

[22] Filed: Oct. 7, 1991

[30] Foreign Application Priority Data

Oct. 11, 1990 [FR] France .................. 90 12537

[51] Int. Cl.⁵ ............................................. B01D 53/04
[52] U.S. Cl. ........................................ 55/25; 55/74; 55/387; 55/475; 55/518
[58] Field of Search ............. 55/25, 26, 31, 33, 62, 55/68, 74, 75, 179, 180, 387, 389, 475, 515, 516, 518, 519

[56] References Cited

U.S. PATENT DOCUMENTS

| 2,055,774 | 9/1936 | Ray | 55/387 |
| 2,080,578 | 5/1937 | Ray | 55/387 X |
| 2,450,533 | 10/1948 | Velten | 55/387 |
| 3,925,041 | 12/1975 | Patterson et al. | 55/389 X |
| 3,944,403 | 3/1976 | Simpson et al. | 55/387 X |
| 4,168,149 | 9/1979 | Armond et al. | 55/389 X |
| 4,194,891 | 3/1980 | Earls et al. | 55/26 |
| 4,336,042 | 6/1982 | Frantz et al. | 55/475 X |
| 4,353,716 | 10/1982 | Rohde | 55/389 X |
| 4,364,753 | 12/1982 | Wagner | 55/475 X |
| 4,406,675 | 9/1983 | Dangieri et al. | 55/389 X |
| 4,496,376 | 1/1985 | Hradek | 55/389 X |
| 4,698,072 | 10/1987 | Rohde et al. | 55/389 X |
| 4,711,645 | 12/1987 | Kumar | 55/26 |
| 4,750,999 | 6/1988 | Roberts et al. | 55/387 X |
| 4,758,255 | 7/1988 | Yamada et al. | 55/387 X |
| 4,853,004 | 8/1989 | Kaplan et al. | 55/389 X |
| 4,997,465 | 3/1991 | Stanford | 55/475 X |

FOREIGN PATENT DOCUMENTS

| 0080125 | 6/1983 | European Pat. Off. | 55/389 |
| 1922992 | 11/1970 | Fed. Rep. of Germany | 55/387 |
| 2304990 | 8/1973 | Fed. Rep. of Germany | 55/387 |

Primary Examiner—Robert Spitzer
Attorney, Agent, or Firm—Young & Thompson

[57] ABSTRACT

An adsorber having an upright longitudinal extent includes two perforated parallel panels extending within the vessel formed therein and spaced apart defining an adsorbent mass chamber. The adsorbent mass is in two longitudinal parts having a first part of fine particles and a second part of larger particles. The gas to be treated is circulated horizontally between the two perforated panels. This device allows the treatment cycle to be less than 60 seconds with the same or better performance. This adsorber and process are preferably used for the separation of oxygen from air.

23 Claims, 2 Drawing Sheets

ADSORBER AND PROCESS FOR THE SEPARATION BY ADSORPTION

BACKGROUND OF THE INVENTION

1. Field of the Invention

The present invention is directed to a process for separation by adsorption of at least one component of a gaseous mixture, and more particularly, for separating a gaseous mixture of the type which can be circulated through an adsorbent mass in an adsorber while subjected to cyclical pressure variations.

2. Field of the Invention

In practice, this type of process, especially when it is utilized industrially for the production of oxygen by separation of air, is subjected to cycles in which the duration is never less than 2×45 seconds for a system having two adsorbers and with the following performances:

yield 40 to 60%;
productivity approximately 15 $Nm^3/h/m^3$
($Nm^3/h$ $O_2$ produced by $m^3$ of adsorbent).

Conventional adsorbers are generally in the form of vertical cylinders designed for the vertical circulation of gas. In the case of large sizes, horizontal cylinders may be used through which the gas is circulated.

Such devices are considered most practical when it comes to filling the adsorbers while maintaining an adsorbent bed forming a molecular sieve of homogeneous thickness even when subjected to settling. Spherical particles can settle to approximately 5% of the original thickness.

The area of passage is designed such that, during the vertical ascendant pass of the gas, the detachment of the gas from the adsorbent particles is kept at a minimum even at high velocity. Otherwise, the effect would be to rapidly reduce the adsorbent material to a powder through the phenomenon of attrition or mutual rubbing of the particles.

These adsorbers are also designed to provide a homogeneous distribution of the gas. This is easily attained in a vertical cylinder having vertical (ascendant or descendant) passage of the gas. However, such devices are practical only in small capacity installations since the area of the gas passage is technologically limited.

SUMMARY OF THE INVENTION

It is an object of the present invention to provide a relatively low cost system by reducing the time of the cycle to increase productivity. The adsorbent volume necessary can thus be reduced as well as the size of the adsorbers which are the most expensive elements.

However, the reduction of the cycle time below 2×45 seconds has, up to now, been impractical in industrial installations of significant capacity where the production of oxygen required may exceed 5 tons per day. The reasons are threefold and include the risk of reduced performances with present adsorbents, and especially reduced yield and an increase in the energy consumption. The adsorption is, in effect, limited by kinetic phenomena because the velocity of the gas when too high increases the attrition through mutual rubbing of the adsorbent in present-day adsorbers. Pressure losses occur with thicknesses of present-day adsorbent beds.

The aim of the present invention is to provide solutions for the above problems and to provide a process of separation by adsorption for a cycle time of between 20 seconds (2×10) and 60 seconds (2×30) with performances (yield/energy) maintained at a high level such as:

yields of 40 to 60%; and
a productivity which increases to approximately 45 $Nm^3/h/m^3$.

Reaching such performances provides a reduction by a factor of three (return of productivity) of the adsorbent volume and the size of adsorbers, thus obtaining impressive savings in the order of 20 to 50% of the investment in equipmemt including adsorbers, valves, pipes, and machines necessary for the functioning of the cycle.

It is to be noted that the size of the valves, pipes, and machines need not be increased, to increase the output from 15 $Nm^3/h/m^3$ of productivity and one of 45 $Nm^3/h/m^3$.

Thus, cost savings are obtained by using a smaller quantity of adsorbent (⅓) and smaller adsorbers.

The objects of the invention are attained by the fact that the gaseous mixture is circulated in a first direction horizontally in an adsorbent mass having its longest dimension, orthogonal to the first direction, greater than the dimension or average thickness of the adsorbent in the direction of the circulation of the gas. The adsorbent mass includes at least a downstream portion with respect to the direction of flow of the gas which is formed of fine adsorbent particles of which the average granulometry is smaller than 1.7 mm, and preferably between 0.4 and 1.5 mm, and more specifically, between 0.8 and 1.2 mm, and that a cycle having a duration between 20 and 60 seconds is obtained, more specifically between 40 and 50 seconds, by limiting to 200 mb ($2 \times 10^4$ Pa), specifically between 50 and 100 mb, the pressure loss between the inlet and the outlet of the adsorbent mass during the introduction of the gaseous mixture to be treated.

According to the above process, the fine granulometry of the adsorbent allows an increase of the adsorption kinetics while the gas velocity is increased. Furthermore, a horizontal circulation of the gas puts off the attrition phenomenon to velocities of five to seven times greater than those utilized in systems having vertical ascendant circulation.

The present invention contemplates several embodiments of the process, separately or in combination. For instance, an adsorbent mass could be made up completely of fine particles of between 0.4 to 1.7 mm, and preferably between 0.8 and 1.5 mm. In another embodiment, only a downstream portion of the adsorbent mass is constituted of fine particles while the upstream portion relative to the direction of flow of the gaseous mixture in its production phase is made up of particles of a granulometry greater than 1.7 mm, for example, in the order of 2 mm. In the latter case, the percentage of the weight of the fine particles of the adsorbent material with respect to the total weight of the adsorbent mass is preferably between 30 and 70%. Preferably, the longest dimension of the adsorbent mass is approximately 1.5 to 3 times the average dimension of the adsorbent mass in the direction of circulation of the flow of the gaseous mixture in its production phase.

The present invention is also directed to an adsorber which includes a vessel having its longest dimension in the longitudinal direction thereof and the interior of the vessel being provided with two perforated panels spaced one from the other defining between them with the internal walls of the vessel, a chamber containing the adsorbent mass with particles having a particle dimension smaller than 1.7 mm, and longitudinal collector chambers defined between each perforated panel and the adjacent vessel wall. These longitudinal collector chambers are provided for admission or evacuation of the gas, and each chamber is provided with a tubular pipe portion extending through the respective vessel wall portion to allow for admission or evacuation of the gas into or out of the adsorber.

According to a preferred embodiment of the invention, the adsorber comprises means for compensating for the settling of the adsorbent in the chamber. For instance, the perforated panels end, at one longitudinal end of the vessel, at a short distance from the end wall of the vessel. The compensating means comprises a flexible membrane which can be made of an elastic material defining a separate end chamber sealed from the adsorber chamber and provided with a small pipe extending through the end wall through which a gaseous pressure or vacuum can be supplied. Thus, the particles in the chamber can be maintained in a relatively fixed position under the effect of the compression by the membrane or diaphragm when a pressure is maintained within the end chamber which is at least equal to the highest level of pressure in the cycle in order to avoid the escape of the gas in the head space of the vessel which would, no doubt, happen due to the subsequent settling of the adsorbent material in the chamber.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

Figure 1:
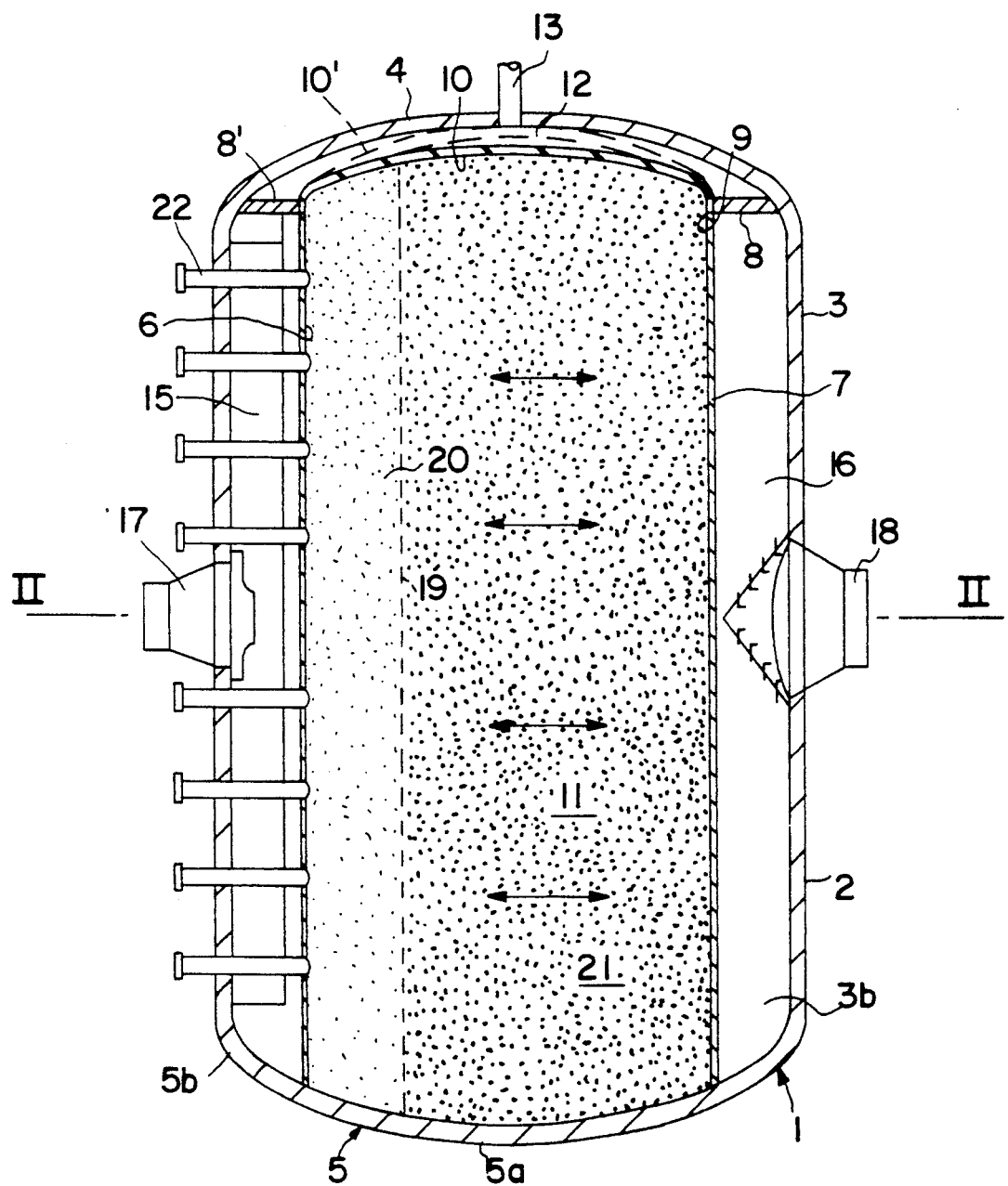
FIG. 1 is a vertical cross-section taken through an adsorber in accordance with the present invention.
Figure 2:
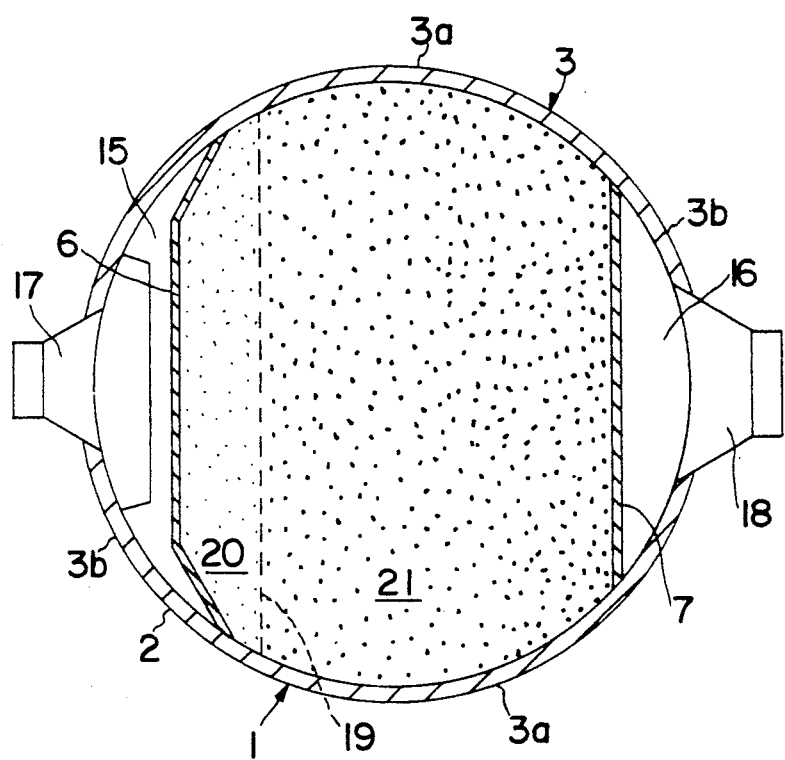
FIG. 2 is a horizontal cross-section of the adsorber according to FIG. 1.

The adsorber 1 comprises a vessel 2 having a lateral wall 3 in the form of a cylindrical sleeve in the longitudinal extent (along a vertical axis), the length of which is greater than the diameter. The sleeve is closed at both ends by convex dome-shaped end walls 4 and 5.

Within the vessel 2 there is provided a pair of perforated panels 6 and 7 which are parallel and might, for instance, be in the form of grills. These perforated panels 6 and 7 extend from the bottom end wall 5 to a short distance from the top end wall 4 where they are connected to the lateral wall by means of transverse wall members 8 and 8'.

A diaphragm or elastic membrane 10 is fixed along its periphery on one hand to the edges 9 of the transverse walls 8 and 8' and the remainder to the vessel wall 3 so as to define an adsorbent chamber 11 between a portion 5a of the bottom wall 5, the perforated panels 6 and 7, portion 3a of the lateral wall 3, and the membrane 10. A compression chamber 12 is sealed from the adsorbent chamber 11 between the top end wall 4 and the membrane 10. The top end wall 4 is provided with a short pipe 13 which can be connected to a pressure supply in order to service the chamber 12.

The perforated panels 6 and 7 define respectively on the exterior faces thereof two internal collectors 15 and 16 allowing the distribution of the gas. The collector chamber 15 is defined between panels 6 and the adjacent vessel wall portion 3b of the lateral wall 3 and a portion 5b of the bottom wall 5 and the wall portion 8. The collector chamber 16 is defined between the panel 7 and a respective vessel wall portion 3b, bottom wall portion 5b, and top wall portion 8. Collector chamber 15 is provided with a large tubular pipe 17 while the collector 16 is provided with a similar pipe 18 passing through the vessel wall and adapted to be connected to a supply for the flow of gas from one pipe to the other through the chambers defined by the vessel 2.

In the present embodiment, the adsorbent chamber 11 is filled with adsorbent particles having a different granulometry and which extends from side to side in vertical stratified layers and defining a vertical interface 19 between the two particle masses of different size. On the left-hand side, in the drawing, of the interface 19, there is provided adsorbent material 20 which is made up of fine particles having a granulometry between 0.4 and 1.7 mm, preferably between 0.8 and 1.5 mm, while on the right-hand side of the interface 19, there is provided a particle size of adsorbent 21 which has the usual average granulometry typically between 1.7 and 2.4 mm, and generally in the order of 2 mm.

The manner in which the vessel is filled with these two different adsorbent masses will now be described.

The adsorber vessel 2 is also provided with a number of filler pipes 22 extending radially from the exterior of the vessel wall 3 to open through the perforated panel 6.

At the setup site, the adsorber 1 is placed with its longitudinal axis horizontally, that is, with the tubular filled pipes 22 extending vertically and in the upper position. The vessel is then filled by introducing: first, an adsorbent material having particles of larger granulometry; and then, second, by the particle fines in order to provide a first layer 20 succeeded by a second layer 21. During this operation, the chamber 12 is depressed, and the membrane 10 is allowed to be pressed against the internal face of the upper wall 4 (position 10' in FIG. 1), allowing the maximum space in the chamber 11 for the particles of the adsorbent mass. After the chamber 11 is completely filled with the two layers 20, 21 of adsorbent particles, a pressure is applied in the compression chamber 12 such that the membrane will be pressed against the particle mass, thus compressing the particles and assuming a position 10 in FIG. 1. This pressure is maintained indefinitely.

On the production site, the adsorber 1 is raised to a vertical position, such as represented in FIG. 1. The inlet of the gaseous mixture to be treated is provided at the pipe inlet 18 and the collector 16 in the cocurrent direction as well as the perforated panel 7 form the inlet window while the collector 15, the pipe 17, and the panel 6 form the outlet window which can serve for different bleeding in the cocurrent direction and/or admission countercurrently. As well, different bleeding can be effected through the collector 16 and the pipe 18 in the countercurrent direction.

The process and the adsorber described can be used in a number of gaseous separation applications, especially to obtain oxygen from air. In such a case, the adsorbent will be comprised, for example, of particles of alumina 5A for the layer 21 and 13X for layer 20.

We claim:

1. A process for the separation of at least one component from a gas mixture by adsorption, where the gas is circulated through an adsorbent mass in an adsorber which can be subjected to cyclical pressure variations, including the steps of circulating the gaseous mixture in a first direction in the adsorbent mass, wherein the mass has its longest dimension orthogonal to the first direction and longer than the average dimension of the adsorbent mass in the direction of circulation of the gas, the adsorbent mass including, at least in a downstream portion relative to the flow of gas, during its production phase, particles which have a granulometry smaller than 1.7 mm, and whereby the duration of the cycle is between 20 and 60 seconds while the pressure loss between the inlet and the outlet of the adsorbent mass during the passage of the gaseous mixture to be treated is less than 200 mb.

2. A process as defined in claim 1, characterized in that the granulometry of the adsorbent particles is between 0.8 and 1.5 mm.

3. A process according to claim 1, characterized in that the duration of the cycle is between 40 and 50 seconds.

4. A process according to claim 1, characterized in that the pressure loss is no higher than a value in the order of 100 mb.

5. A process as defined in claim 4, wherein the pressure loss is no higher than a value in the order of 50 mb.

6. A process according to claim 1, wherein an upstream portion of the adsorbent mass in the direction of flow of the gaseous mixture during the production phase is formed of particles having a granulometry greater than 1.7 mm.

7. A process according to claim 1, wherein the totality of the adsorbent mass has a particle size having a granulometry of between 0.4 and 1.7 mm.

8. A process according to claim 1, wherein the percentage by weight of the particles of the adsorbent mass as a factor of the weight of the total adsorbent mass is between 30 and 70%.

9. A process according to claim 1, wherein the longest dimension of the adsorbent mass is 1.5 to 3 times the average dimension of the adsorbent mass in the flow direction of the gaseous mixture in the production phase.

10. A process according to claim 1, wherein said first direction is horizontal.

11. A process for filling an adsorber vessel having a cylindrical form and a longitudinal axis and wherein filling pipes are provided for passing through a portion of the vessel wall and communicating with an adsorbent mass chamber within the vessel such that the vessel is laid with its longitudinal axis in the horizontal direction and the filling pipes extending upwardly so that the adsorbent material or particles can be filled into the adsorbent mass chamber through the filling pipes, and when the adsorbent chamber is completely filled, the vessel is raised to such that its longitudinal axis is in the vertical.

12. An adsorber for separating a gaseous mixture comprising a closed vessel containing an adsorbent mass of adsorbent particles, wherein the vessel has its longest dimension in the longitudinal axis and includes two spaced-apart, parallel, perforated panels extending longitudinally and defining therebetween and with parts of the vessel wall, a chamber containing the adsorbent particles of the adsorbent mass, one of the panels defining with the adjacent portion of the vessel wall, an inlet collection chamber, an inlet pipe passing through the vessel wall and communicating with the inlet collection chamber for receiving admission of the gaseous mixture while the other perforated panel defines with an adjacent vessel wall an outlet collection chamber, an outlet pipe extending through the vessel wall communicating with the outlet collection chamber to allow the evacuation of the gaseous mixture, such that a flow of the gaseous mixture can pass from the inlet collection chamber to the outlet collection chamber through the adsorbent mass between the perforated panels, at least a portion of the adsorbent particles contained in the chamber between the perforated panels having a granulometry of less than 1.7 mm.

13. An adsorber according to claim 12, wherein compensator means are provided for compensating for the settling of the adsorbent particles in the adsorbent mass chamber.

14. An adsorber according to claim 13, wherein the perforated panels extend from the bottom end wall of the vessel to a short distance from the top end wall, and the compensating means comprises a flexible diaphragm defining a pressure chamber with the top end wall between the ends of the panels and the top end wall and connector means are provided to communicate the pressure chamber with a source of pressure or vacuum.

15. An adsorber according to claim 12, wherein the dimension of the vessel in the longitudinal axis is 1.5 to 3 times the transverse dimension between the perforated panels.

16. An adsorber according to claim 12, wherein the vessel has a cylindrical configuration with convex end walls.

17. An adsorber according to claim 12, said adsorbent particles extending in a longitudinal stratified layer in contact with the downstream perforated panel relative to the flow of the mixed gas from the inlet to the outlet.

18. An adsorber according to claim 17, wherein the adsorbent chamber is totally filled with adsorbent particles having a granulometry of between 0.4 and 1.7 mm.

19. An adsorber according to claim 17, wherein the layer of the particles having a granulometry of less than 1.7 mm has a thickness which is less than the distance between the two perforated panels, and the remaining portion of the chamber is filled with adsorbent particles having a granulometry of greater than 1.7 mm.

20. An adsorber according to claim 12, wherein a series of filling pipes extends through the vessel wall, the outlet collector chamber, and communicate with the adsorbent chamber through the downstream perforated panel, and these filling pipes are adapted to be closed by suitable valve means.

21. An adsorber according to claim 12, wherein said longitudinal axis is vertical.

22. A pressure swing adsorber device for separating a gaseous mixture, comprising a closed vessel having a vessel wall and containing an adsorbent mass, wherein the vessel has its longest dimension along a vertical axis and includes two spaced-apart parallel, perforated panels extending vertically and defining therebetween and with parts of the vessel walls an inner volume filled with the adsorbent mass, one of said panels defining with an adjacent portion of the vessel wall a lateral inlet connection chamber, an inlet pipe passing through the vessel wall and communicating with the inlet connection chamber, the other perforated panel defining with an adjacent portion of the vessel wall a lateral outlet connection chamber, an outlet pipe extending through the vessel wall and communicating with the outlet connection chamber, whereby a flow of the gaseous mixture can pass from the inlet pipe to the outlet pipe substantially horizontally through the adsorbent mass enclosed between the perforated panels.

23. The adsorption device of claim 22, further including, within an upper portion of the vessel, compensator means for compensating the setting of the adsorbent mass.

* * * * *

UNITED STATES PATENT AND TRADEMARK OFFICE
CERTIFICATE OF CORRECTION

PATENT NO. : 5,176,721

DATED : January 5, 1993

INVENTOR(S) : Leon HAY et al.

It is certified that error appears in the above—identified patent and that said Letters Patent is hereby corrected as shown below:

Col. 6, line 66,

Claim 23, line 3, change "setting" to --settling--.

Signed and Sealed this

Twenty-first Day of February, 1995

Attest:

BRUCE LEHMAN

*Attesting Officer*    *Commissioner of Patents and Trademarks*